US012756438B2

(12) United States Patent
Wang et al.

(10) Patent No.: US 12,756,438 B2
(45) Date of Patent: Oct. 6, 2026

(54) BEAMFORMING METHOD, NETWORK DEVICE, TERMINAL, AND STORAGE MEDIUM

(71) Applicant: ZTE CORPORATION, Shenzhen (CN)

(72) Inventors: Zhipeng Wang, Shenzhen (CN); Pengfei Liu, Shenzhen (CN); Yusen Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 588 days.

(21) Appl. No.: 18/041,923

(22) PCT Filed: Aug. 12, 2021

(86) PCT No.: PCT/CN2021/112313
§ 371 (c)(1),
(2) Date: Feb. 16, 2023

(87) PCT Pub. No.: WO2022/037475
PCT Pub. Date: Feb. 24, 2022

(65) Prior Publication Data

US 2023/0327725 A1 Oct. 12, 2023

(30) Foreign Application Priority Data

Aug. 18, 2020 (CN) ......................... 202010833588.4

(51) Int. Cl.
*H04B 7/06* (2006.01)
*H04B 7/08* (2006.01)

(52) U.S. Cl.
CPC ......... *H04B 7/0617* (2013.01); *H04B 7/0639* (2013.01); *H04B 7/086* (2013.01)

(58) Field of Classification Search
CPC .... H04B 7/0617; H04B 7/0639; H04B 7/086; H04B 7/10; H04B 7/0469; H04B 7/0456; Y02D 30/70
See application file for complete search history.

(56) References Cited

U.S. PATENT DOCUMENTS

2010/0164802 A1* 7/2010 Li ...................... H04B 7/06958 342/368
2011/0205930 A1* 8/2011 Rahman ................ H04L 5/0023 370/252
(Continued)

FOREIGN PATENT DOCUMENTS

CN 102832985 A 12/2012
CN 105356924 A 2/2016
(Continued)

OTHER PUBLICATIONS

Abdul Latif Sarker and Moon Ho Lee. "Design A Precoding Codebook Generator with An Angular Channel Model Using Eigen Beamforming" in 2012 Ninth International Conference on Wireless and Optical Communications Networks (WOCN) (Year: 2012).*
(Continued)

*Primary Examiner* — Kwang B Yao
*Assistant Examiner* — Patrick Yipao Pei
(74) *Attorney, Agent, or Firm* — Vivacqua Crane, PLLC

(57) ABSTRACT

A beamforming method, a network device, a terminal, and a storage medium are disclosed. The beamforming method may include: acquiring Direction of Arrival (DOA) information; obtaining a first beamforming weight in a first polarized antenna direction according to the DOA information; acquiring precoding matrix indicator information; acquiring a phase difference between the first polarized antenna direction and a second polarized antenna direction according to the precoding matrix indicator information; obtaining a second beamforming weight in the second
(Continued)

polarized antenna direction according to the first beamforming weight and the phase difference; and producing a formed beam according to the first beamforming weight and the second beamforming weight.

20 Claims, 4 Drawing Sheets

(56) References Cited

U.S. PATENT DOCUMENTS

| | | | | |
|---|---|---|---|---|
| 2013/0114763 | A1 | 5/2013 | Park | |
| 2013/0257655 | A1* | 10/2013 | Hu | H04B 7/0686 342/373 |
| 2013/0322376 | A1* | 12/2013 | Marinier | H04L 1/0027 370/329 |
| 2014/0187171 | A1 | 7/2014 | Xiao et al. | |
| 2015/0085838 | A1 | 3/2015 | Benjebbour et al. | |
| 2015/0372740 | A1* | 12/2015 | Ko | H04B 7/0665 370/329 |
| 2015/0381247 | A1 | 12/2015 | Ko et al. | |
| 2017/0127048 | A1* | 5/2017 | Nobayashi | H04N 13/128 |
| 2018/0268868 | A1 | 9/2018 | Salokannel et al. | |
| 2020/0267681 | A1* | 8/2020 | Ferrari | H04B 17/27 |

FOREIGN PATENT DOCUMENTS

| | | | |
|---|---|---|---|
| CN | 105406906 | A | 3/2016 |
| CN | 106034307 | A | 10/2016 |
| CN | 109120321 | A | 1/2019 |
| JP | 2013534110 | A | 8/2013 |
| JP | 2013232741 | A | 11/2013 |
| JP | 2016516337 | A | 6/2016 |
| JP | 2018534826 | A | 11/2018 |
| WO | 2010017664 | A1 | 2/2010 |

OTHER PUBLICATIONS

3GPP Technical Specification Group Radio Access Network. "Considerations on Dual-layer Beamforming," 3GPP TSG RAN WG1 Meeting #56bis, Mar. 2009, pp. 1-3.

3GPP Technical Specification Group Radio Access Network. "Reporting of CQI/PMI/RI for dual layer beamforming," 3GPP TSG RAN WG1 Meeting #57bis, 2009, pp. 1-5.

International Searching Authority. International Search Report and Written Opinion for PCT Application ho. PCT/CN2021/112313 and English translation, mailed Nov. 11, 2021, pp. 1-10.

The State Intellectual Property Office of People's Republic of China. First Office Action for CN Application No. 202010833588.4 and English translation, mailed Dec. 22, 2021, pp. 1-7.

The State Intellectual Property Office of People's Republic of China. First Search Report for CN Application No. 202010833588.4 and English translation, mailed Dec. 14, 2021, pp. 1-5.

The State Intellectual Property Office of People's Republic of China. Second Office Action for CN Application No. 202010833588.4 and English translation, mailed Mar. 8, 2022, pp. 1-6.

The State Intellectual Property Office of People's Republic of China. Supplementary Search Report for CN Application No. 202010833588.4 and English translation, mailed Apr. 24, 2022, pp. 1-5.

European Patent Office. Extended European Search Report for EP Application No. 21857570.2, mailed Feb. 19, 2024, pp. 1-14.

Japan Patent Office. Notice of Reasons for Refusal for JP Application No. 2023-505958 and English translation, mailed Jan. 30, 2024, pp. 1-8.

European Patent Office. Supplementary Partial European Search Report for EP Application No. 21857570.2, mailed Nov. 28, 2023, pp. 1-14.

* cited by examiner

BEAMFORMING METHOD, NETWORK DEVICE, TERMINAL, AND STORAGE MEDIUM

CROSS-REFERENCE TO RELATED APPLICATION

This application is a national stage filing under 35 U.S.C. § 371 of international application number PCT/CN2021/112313, filed on Aug. 12, 2021, which claims priority to Chinese Patent Application No. 202010833588.4, filed on Aug. 18, 2020. The entire contents of these application are incorporated herein by reference.

TECHNICAL FIELD

The present disclosure relates to the technical field of wireless communication, and in particular to a beamforming method, a network device, a terminal and a storage medium.

BACKGROUND

Beamforming is a signal preprocessing technology based on an antenna array. Beamforming produces directional beams by adjusting the weight coefficient of each array element in the antenna array, so that an obvious array gain can be obtained. Therefore, the beamforming technology has great advantages in expanding coverage, improving edge throughput, suppressing interference and the like.

In some cases, beamforming is performed by a Direction of Arrival (DOA) algorithm, and the beamforming weight is calculated by utilizing the DOA angle, so that narrower beams with more concentrated energy can be produced. However, with the DOA algorithm, only one layer of services can be borne in one antenna polarization direction, resulting in poor anti-interference capability and low transmission traffic of the transmission channel.

SUMMARY

The embodiments of the present disclosure provide a beamforming method, a network device, a terminal device and a storage medium.

In accordance with an aspect of the present disclosure, an embodiment provides a beamforming method, which is applied to a network device. The method may include: acquiring Direction of Arrival (DOA) information; obtaining a first beamforming weight in a first polarized antenna direction according to the DOA information; acquiring precoding matrix indicator information; acquiring a phase difference between the first polarized antenna direction and a second polarized antenna direction according to the precoding matrix indicator information; obtaining a second beamforming weight in the second polarized antenna direction according to the first beamforming weight and the phase difference; and, producing a formed beam according to the first beamforming weight and the second beamforming weight.

In accordance with an aspect of the present disclosure, an embodiment provides a beamforming method, which is applied to a terminal device communicatively connected to a network device. The method may include: acquiring location information of the terminal device; and, transmitting the location information of the terminal device to the network device, so that the network device implements the beamforming method described in the above aspect.

In accordance with an aspect of the present disclosure, an embodiment provides a network device. The device may include a first memory, a first processor and a program stored on the first memory and executable by the first processor which, when executed by the first processor, causes the first processor to implement the beamforming method applied to the network device as described above.

In accordance with an aspect of the present disclosure, an embodiment provides a terminal device. The terminal device may include a second memory, a second processor and a program stored on the second memory and executable by the second processor which, when executed by the second processor, causes the second processor to implement the beamforming method applied to the terminal device communicatively connected to a network device as described above.

In accordance with an aspect of the present disclosure, an embodiment provides a storage medium for computer-readable storage, where the storage medium stores at least one program which, when executed by at least one processor, causes the at least one processor to implement the beamforming method applied to the network device or the beamforming method applied to the terminal device communicatively connected to a network device as described above.

Other features and advantages of the present disclosure will be set forth in the subsequent description, and partially become apparent from the description or be appreciated by implementing the present disclosure. The objectives and other advantages of the present disclosure can be achieved and obtained by the structures specified in the description, the claims, and the accompanying drawings.

Figure 1:
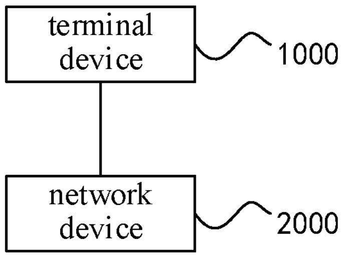
FIG. 1 is a module diagram of a communication system composed of a network device and a terminal device according to an embodiment of the present disclosure.

Reference numerals: 1000 network device; 2000 terminal device; 1001 first processor; 1002 first memory; 2001 second processor; and, 2002 second memory.

DETAILED DESCRIPTION

Objectives, technical schemes and advantages of the present disclosure will be clearer from a detailed description of embodiments of the present disclosure in conjunction with the accompanying drawings. It should be appreciated that the specific embodiments described herein are merely for illustrating the present disclosure, and are not intended to limit the present disclosure. The embodiments in the present disclosure and the features in the embodiments can be arbitrarily combined with each other if not in collision.

It is to be noted, although the logical sequence is shown in the flowcharts, in some cases, the steps shown or described may be executed in a sequence different from that in the flowcharts. The terms such as “first”, “second” and the like in the description, the claims, and the accompanying drawings are used to distinguish similar objects, and are not necessarily used to describe a specific sequence or a precedence order.

Beamforming is a signal preprocessing technology based on an antenna array. Beamforming produces directional beams by adjusting the weight coefficient of each array element in the antenna array, so that an obvious array gain can be obtained. Therefore, the beamforming technology has great advantages in expanding coverage, improving edge throughput, suppressing interference and the like.

For example, in the field of aeronautical communication, there are mainly two communication schemes, i.e., a satellite communication scheme and an Air to Ground (ATG) scheme. The satellite communication scheme has a wide coverage range, including both land and sea, but has high deployment and operation cost and large network delay. In contrast, the ATG scheme can only be deployed on the land, but has the advantages of low cost, high speed, low delay, rapid technological iteration and upgrade, etc.

The ATG communication system adopts a customized wireless transceiver device, and a ground network device and an air antenna are erected along a flight route or a particular airspace to establish a ground-to-air communication link, thereby accessing to the Internet. In the cabin, the airborne ATG device provides Wireless Local Area Network (WLAV) data services to passengers, and users can establish connections with the airborne ATG device through Wi-Fi. Outside the cabin, the ground network device establishes a communication link with the airborne ATG device.

In the complex ATG communication environment, a single cell may have a radius of 300 km, and narrow beams produced by beamforming using only the precoding matrix indicator (PMI) information may have a final power failing to meet the communication requirements, as the distance between the user and the network device increases, the beam spread increases, and the energy per unit coverage space decreases. Therefore, the ATG communication system requires narrower beams to make the energy more concentrated to achieve ultra-far coverage.

When the Direction of Arrival (DOA) angle is calculated based on the Global Positioning System (GPS) for beamforming, the DOA angle calculated by utilizing relative positions of the network device and the airplane can have an accuracy up to 1°, which is higher than the accuracy of the angle calculated according to the PMI information, so that narrower beams with more concentrated energy can be produced. However, when beamforming is performed according to the DOA algorithm, only one layer of services can be borne in one antenna polarization direction. If the ATG communication system desires to transmit two layers of service data, half of the antenna gain will be lost due to the use of only the DOA algorithm, resulting in weak anti-interference capability and low traffic.

In view of the above, the embodiments of the present disclosure provide a dual-polarization beamforming method, a network device, a terminal device and a storage medium. The ATG communication system calculates the relative positions of a network device and an airplane according to the GPS information of the airplane and the network device by a Direction of Arrival (DOA) algorithm, and then adjusts an antenna transmitting direction. The ground communication system calculates the relative positions of the terminal device and the network device according to precoding matrix indicator (PMI) information reported by the terminal device, then adjusts a beam direction and calculates a beamforming weigh to perform beamforming. In the embodiments of the present disclosure, by performing dual-polarization beamforming according to the DOA algorithm and the PMI information, the problems of weak long-distance antenna power coverage in the air-to-ground communication and weak anti-interference capability when transmitting two layers of data can be overcome.

It is to be noted that, in the following embodiments, with reference to FIG. 1, a network device 1000 and a terminal device 2000 are communicatively connected to form a communication system. The network device 1000 may be a base station (e.g., a NodeB base station, an eNB base station, a gNB base station, etc.), or may be other network devices 1000 with base station functions. For example, in the ATG communication system, the network device 1000 includes a gNB base station, a core network and a related server. The core network provides communication services to the terminal device 2000 through the gNB base station. The network device 1000 has a dual-polarized antenna that is composed of two sets of antennas. Compared with ordinary vertically-polarized antenna elements, all antenna array elements in one set of antennas are rotated by +45 degrees, while the antenna elements in the other set of antennas are rotated by −45 degrees, so that the two sets of antennas are orthogonally polarized. By utilizing the dual-polarized array antennas, the size of antennas is observably decreased, the reliability of antennas is improved, and the interference is effectively reduced.

The terminal device 2000 may be a mobile terminal device or an immobile terminal device. The mobile terminal device may be a mobile phone, a tablet computer, a notebook computer, a palmtop computer, an on-board terminal device, a wearable device, a super mobile personal computer, a netbook, a personal digital assistant, a Customer Premises Equipment (CPE), a wireless hotspot device (UFI), etc. The immobile terminal device may be a personal computer, a TV set, a teller machine, a self-service machine, etc. This will not be specifically limited in the implementations of the present disclosure. For example, in the ATG communication system, the terminal device 2000 may include an Airborne Controller Processor Unit (ACPU), a WIFI hotpot device, an airborne CPE, etc. In some embodiments, the WIFI hotpot device is connected with the airborne CPE by means of the ACPU to provide Internet services to users of the terminal devices such as notebooks and mobile phones on the airplane, and the airborne CPE is communicatively connected to the gNB base station.

The embodiments of the present disclosure can be applied to various communication systems, such as ground-to-air communication system and ground communication systems. The implementations of the present disclosure will be described below in detail by only taking an ATG communication system as an example.

In accordance with an aspect of the present disclosure, an embodiment provides a beamforming method, which is applied to a network device. In some embodiments, the network device has quite different hardware structures due to different configurations or performances. The network device may include one or more processors, at least one memory and at least one network interface. The memory is configured to store one or more operating systems, and store computer program codes and data. The computer program codes stored in the memory may include one or more modules, each of which may include a series of instruction operations corresponding to the network device. The processor is communicated with the memory and the network interface. The network device is communicated with other devices in the core network and the base station through the network interface. The processor executes, on the network device, a series of instruction operations in the memory to implement all or some of the steps implemented by the network device in the beamforming method embodiment in the aspect (the embodiment shown in FIG. 2). The network device has a dual-polarized antenna which is composed of two sets of antennas. Compared with ordinary vertically-polarized antenna elements, all antenna array elements in one set of antennas are rotated by +45 degrees, while the antenna elements in the other set of antennas are rotated by −45 degrees, so that the two sets of antennas are orthogonally polarized. By utilizing the dual-polarized array antennas, the size of antennas is observably decreased, the reliability of antennas is improved, and the interference is effectively reduced.

Figure 2:
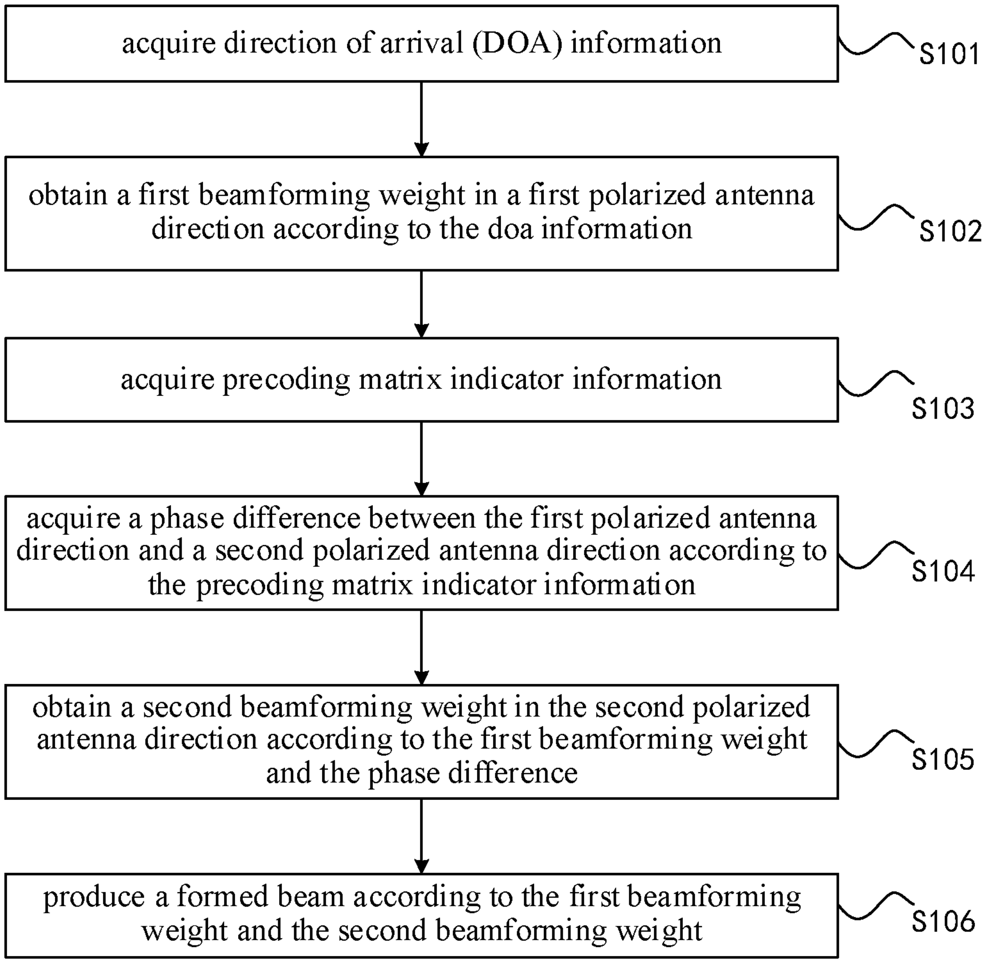
FIG. 2 is a flowchart of a beamforming method according to an embodiment of the present disclosure.

With reference to FIG. 2, the beamforming method provided in this embodiment of the present disclosure includes the following steps S101 to S106.

At step S101, Direction of Arrival (DOA) information is acquired.

At step S102, a first beamforming weight in a first polarized antenna direction is obtained according to the DOA information.

At step S103, precoding matrix indicator information is acquired.

At step S104, a phase difference between the first polarized antenna direction and a second polarized antenna direction is acquired according to the precoding matrix indicator information.

At step S105, a second beamforming weight in the second polarized antenna direction is obtained according to the first beamforming weight and the phase difference.

At step S106, a formed beam is produced according to the first beamforming weight and the second beamforming weight.

In the embodiment of the present disclosure, by performing beamforming in the first polarization direction using the DOA algorithm, the beams formed by the network device are narrower and higher in energy concentration, which effectively improves the signal-to-noise ratio.

By constructing an orthogonal codebook using the precoding matrix indicator information, the beams in the second polarization direction are formed, one polarized antenna transmits two layers of data, and the antenna gain of each layer of data is increased, so that the inter-interference capability and transmission traffic of transmission channels are effectively improved.

Figure 3:
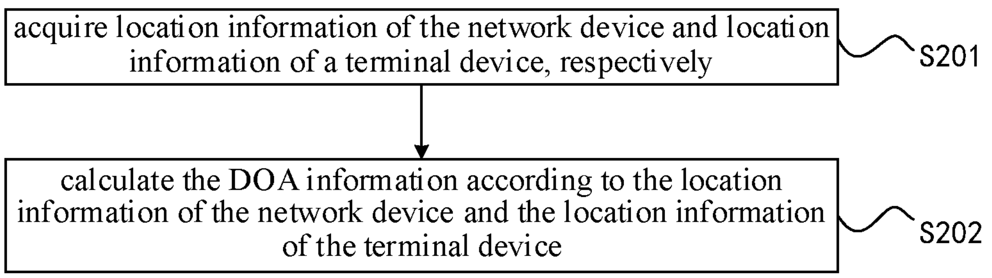
FIG. 3 is a flowchart of a beamforming method according to another embodiment of the present disclosure.

In some embodiments, the DOA information at step S101 is DOA angle information. In some embodiments, with reference to FIG. 3, step S101 includes the following sub-steps.

At step S201, location information of the network device and location information of a terminal device are acquired, respectively.

At step S202, the DOA information is calculated according to the location information of the network device and the location information of the terminal device.

In some embodiments, at step S201, the location information of the network device and the location information of the terminal device may be acquired by a satellite positioning technology (e.g., GPS, BEIDOU satellite, etc.). The location information of the network device may be GPS information, BEIDOU satellite positioning information, etc. The location information of the terminal device may be GPS information, BEIDOU satellite positioning information, etc.

In some embodiments, at step S202, the DOA information may be obtained according to the location information of the network device and the location information of the terminal device by a geometric operation. For example, in the ATG communication system, after the GPS information of an airplane (the location information of the terminal device) is received, the DOA angle information can be calculated by a geometric operation in combination with the GPS information of the base station (the location information of the network device).

In some embodiments, the location information of the network device includes a longitude $J_A$ of the network device, a latitude $W_B$ of the network device, a height $H_A$ of the network device, etc. The location information of the terminal device includes a longitude $J_B$ of the terminal device, a latitude $W_B$ of the terminal device, a height $H_B$ of the terminal device, etc. The DOA information includes a pitch angle α and a horizontal angle β.

Figure 4:
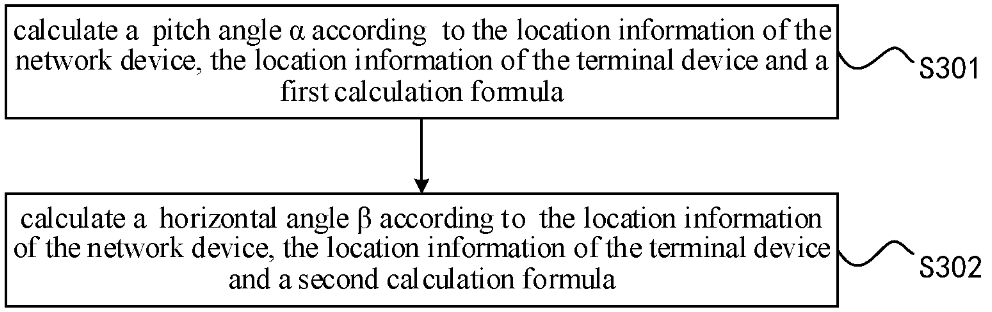
FIG. 4 is a flowchart of a beamforming method according to another embodiment of the present disclosure.

With reference FIG. 4, in some embodiments, at step S202, calculating the DOA information according to the location information of the network device and the location information of the terminal device includes the following steps.

At step S301, the pitch angle α is calculated according to the location information of the network device, the location information of the terminal device and a first calculation formula.

At step S302, the horizontal angle β is calculated according to the location information of the network device, the location information of the terminal device and a second calculation formula.

The pitch angle α in the DOA information can be calculated by the first calculation formula according to the law of cosines. For example, the first formula may be:

$$\alpha = \arccos\left[\frac{(R+H_A)^2 + |AB|^2 - (R+H_B)^2}{2(R+H_A)\cdot|AB|}\right].$$

The horizontal angle β in the DOA information can be calculated by the second calculation formula according to an inverse sine algorithm. For example, the second formula may be:

$$\beta = \arcsin\left[\left|\frac{\cos(W_B)\cdot\sin(J_B - J_A)}{\sqrt{1-\cos^2(\angle AOB)}}\right|\right],$$

where R is a radius of the earth, and ∠AOB is an included angle formed by the network device A and the terminal device B by taking the center O of the earth as a vertex. For example, in the ATG communication system, A is the base station (the network device), O is the center of the earth, B is the airplane (the terminal device), and therefore |AB| is the distance between the base station and the airplane; and, ∠AOB is the included angle formed by three points, i.e., the base station, the center of the earth and the airplane.

In some embodiments, after a cell is established for the base station (the network device), the base station will update the GPS information every fixed period (e.g., 20 hours) or after the GPS information of the base station is changed, to ensure the timeliness and accuracy of the base station location information. After the airplane (the terminal device) accesses to the cell, the terminal device reports the GPS information (including the longitude/latitude, a height above the ground, an altitude and time) of the terminal device or other parameters every fixed period (e.g., 1 second), to ensure the timeliness and accuracy of the location information of the terminal device. For example, in the ATG communication system, after the airplane (the terminal device) accesses to the cell, the CPE in the airplane transmits the GPS information of the airplane to the base station every 1 second.

In the embodiment of the present disclosure, by acquiring the location information of the network device and the location information of the terminal device, the DOA information is calculated, so that it is determined which terminal device is operating and the direction of the terminal device. Thus, the calculation is simple, and the accuracy is high (the accuracy of the DOA angle can reach 10).

Figure 5:
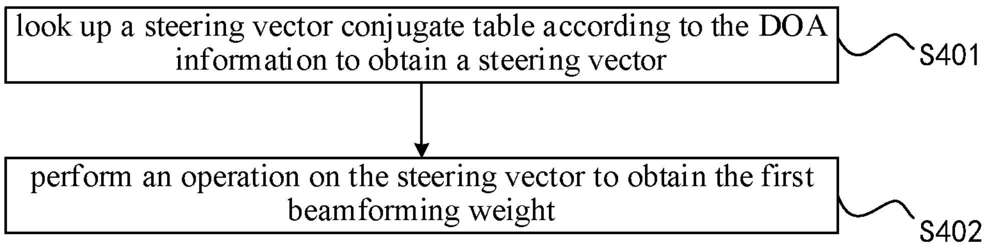
FIG. 5 is a flowchart of a beamforming method according to another embodiment of the present disclosure.

With reference to FIG. 5, in some embodiments, at step S102, obtaining a first beamforming weight in a first polarized antenna direction according to the DOA information includes the following sub-steps.

At step S401, a steering vector conjugate table is looked up according to the DOA information to obtain a steering vector.

At step S402, an operation is performed on the steering vector to obtain the first beamforming weight.

In some embodiments, at step S401, a steering vector conjugate table is first determined according to a specific antenna layout. Different antenna layouts have different steering vector conjugate tables, and the steering conjugate table contains a correspondence between steering vectors and the DOA information. The steering vector can be obtained by looking up the steering vector conjugate table according to the DOA information.

In some embodiments, at step S402, an operation is performed on the steering vector to obtain the first beamforming weight. Specifically, the first beamforming weight is equal to a dot product of the steering vector and a basic matrix (e.g., unit matrix), and an operation can be performed according to the steering vector to obtain the first beamforming weight.

In some embodiments, a forming weight $W_{DOA}$ in a DOA single polarization direction (the first polarized antenna direction) is calculated according to the DOA information and a third calculation formula. The third calculation formula is: $W_{DOA}=\text{conj}(a(\alpha, \beta))$, where $a(\alpha, \beta)$ is a forming matrix generated according to the pitch angle $\alpha$ and the horizontal angle $\beta$ in the DOA information. The forming matrix $a(\alpha, \beta)$ is the dot product of the steering vector and the basic matrix (e.g., unit matrix), and the forming weight $W_{DOA}$ is a conjugate of the forming matrix, that is, $W_{DOA}=\text{conj}(a(\alpha, \beta))$. The specific value of the forming weight is related to the hardware layout of the polarized antenna.

In the embodiment of the present disclosure, beamforming is performed based on the DOA information, and the accuracy of the DOA angle calculated by the relative positions of the base station and the airplane can reach 1°, so that narrower beams with more concentrated energy can be produced.

Figure 6:
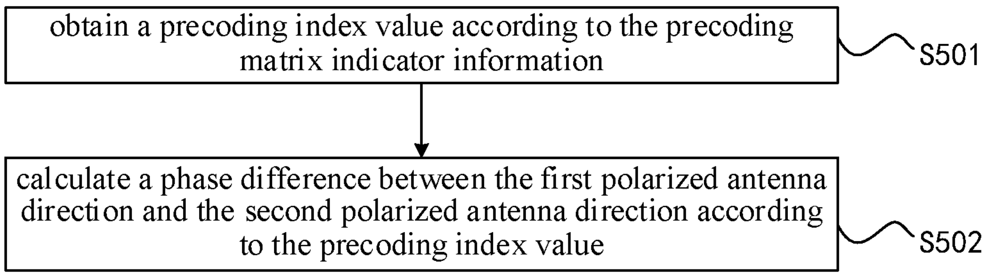
FIG. 6 is a flowchart of a beamforming method according to another embodiment of the present disclosure.

With reference to FIG. 6, in some embodiments, at step S104, acquiring a phase difference between the first polarized antenna direction and a second polarized antenna direction according to the precoding matrix indicator information includes the following steps.

At step S501, a precoding index value is obtained according to the precoding matrix indicator information.

At step S502, the phase difference between the first polarized antenna direction and the second polarized antenna direction is calculated according to the precoding index value.

In some embodiments, at step S501, the precoding matrix indicator information comes from the terminal device. That is, upon measuring the precoding matrix indicator (PMI) information, the terminal device reports the PMI information to the network device. The network device obtains a precoding index value $i_2$ according to the PMI information. In some embodiments, in the codebook-based precoding technology, the precoding matrix is generated in the terminal device. That is, the terminal device estimates Channel State Information (CSI) by utilizing the received pilot information, and selects an optimal or suboptimal precoding matrix from a predesigned precoding matrix codebook according to a certain criterion. Finally, the index value $i_2$ of the selected precoding matrix is transmitted through a feedback link. The application scenario of one codebook is relatively specific and fixed, and the codebook designs in different scenarios are quite different.

In some embodiments, at step S502, the phase difference between the first polarized antenna direction and the second polarized antenna direction according to the precoding index value $i_2$ is calculated. Specifically, the phase difference between the first polarized antenna direction and the second polarized antenna direction is calculated according to the precoding index value $i_2$ and a fourth calculation formula, where the fourth calculation formula is:

$$\varphi = e^{j\frac{\pi i_2}{2}}.$$

When the number of layers ilayer of the transmitted data is 1, $\phi=\varphi$; and, when the number of layers ilayer of the transmitted data is 2, $\phi=[\varphi, -\varphi]$.

$\phi$ is the phase difference between the first polarized antenna direction and the second polarized antenna direction, j is an imaginary unit, and e is base of the natural logarithm.

In some embodiments, at step S502, the phase difference between the first polarized antenna direction and the second polarized antenna direction according to the precoding index value $i_2$ is calculated. Specifically, the phase difference between the first polarized antenna direction and the second polarized antenna direction is calculated according to the precoding index value $i_2$ and a fifth calculation formula, where the fifth calculation formula is:

$$\phi(i\text{layer})=\text{angle}(W_{pmi}(i_2, i\text{layer}))$$

where $\phi$(ilayer) is the phase difference between the first polarized antenna direction and the second polarized antenna direction, ilayer is the number of layers of the transmitted data, and $W_{pmi}$ is a precoding vector generated according to the PMI information. The phase difference $\phi$(ilayer) can be obtained by calculating a complex phase angle of the precoding vector $W_{pmi}$, that is, $\phi$(ilayer)=angle($W_{pmi}(i_2$,ilayer). For example, if the calculated phase difference is 90° or 270°, an orthogonal codebook can be constructed according to the phase difference so that one polarized antenna can transmit two layers of data.

In the embodiment of the present disclosure, the difference phase between the first polarized antenna direction and the second polarized antenna direction is calculated by utilizing the PMI information to facilitate the subsequent construction of the orthogonal codebook, so that one polarized antenna can transmit two layers of data, the antenna gain of each layer of data is increased, and the anti-interference capability is improved.

Figure 7:
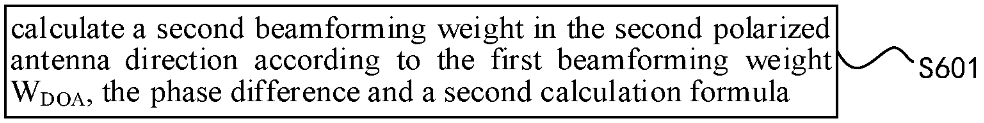
FIG. 7 is a flowchart of a beamforming method according to another embodiment of the present disclosure.

With reference to FIG. 7, in some embodiments, at step S105, obtaining a second beamforming weight in the second polarized antenna direction according to the first beamforming weight and the phase difference includes a following step.

At step S601, the second beamforming weight $\tilde{W}_{DOA}$ in the second polarized antenna direction is calculated according to the first beamforming weight $W_{DOA}$, the phase difference and a second calculation formula.

The second calculation formula is:

$$\tilde{W}_{DOA}=W_{DOA}\times e^{j\phi(ilayer)};$$

where $\phi$(ilayer) is the phase difference between the first polarized antenna direction and the second polarized antenna direction, and ilayer is the number of layers of the transmitted data.

In the embodiment of the present disclosure, by utilizing the first beamforming weight $W_{DOA}$ and the phase difference, a codebook orthogonal to the first beamforming weight in the first polarized antenna direction is constructed as the second beamforming weight $\tilde{W}_{DOA}$ in the second polarized antenna direction, so that one polarized antenna can transmit two layers of data, the antenna gain of each layer of data is increased, and the anti-interference capability is improved.

Figure 8:
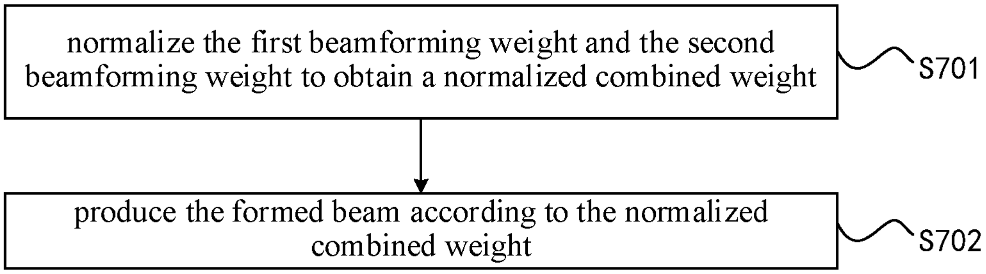
FIG. 8 is a flowchart of a beamforming method according to another embodiment of the present disclosure.

With reference to FIG. 8, in some embodiments, at step S106, producing a formed beam according to the first beamforming weight and the second beamforming weight includes the following steps.

At step S701, the first beamforming weight and the second beamforming weight are normalized to obtain a normalized combined weight.

At step S702, the formed beam is produced according to the normalized combined weight.

In some embodiments, the total power of signals transmitted by the network device will increase with the increase in the number of layers of the transmitted data, and the actual transmitted power of the network device needs to be controlled within a reasonable range. To realize that the transmitted signal power of the network device is within a reasonable range, the transmitted signal power needs to be normalized by implementing steps S701 and S702.

In some embodiments, at step S701, the first beamforming weight and the second beamforming weight is normalized to obtain a normalized combined weight. Specifically, the first beamforming weight and the second beamforming weight are normalized by a third calculation formula to obtain a normalized combined weight.

The third calculation formula is:

$$W_{bf}=\begin{bmatrix} W_{DOA} \\ \tilde{W}_{DOA} \end{bmatrix}/\sqrt{RI};$$

where $W_{bf}$ is the normalized combined weight, and Rank Indicator (RI) is the layer indicator information which corresponds to the number of layers of the transmitted data.

In some embodiments, RI is information measured and reported by the terminal device.

In the embodiment of the present disclosure, the transmitted signal power is normalized by implementing step S106. The transmitted signal power of the network device is controlled within the reasonable range, and two layers of data are transmitted by utilizing dual-polarized antennas, so that the antenna gain of each layer of data is increased and the anti-interference capability is improved. In practical applications, the data service to be transmitted may be divided into two parts, which are subjected to beamforming by utilizing orthogonal codebooks, respectively, so that the two layers of the data service will not interfere with each other during transmission. Thus, the transmitted service is increased from one layer to two layers, and the traffic is improved.

The following description will be given by a complete scenario example. This example is applied to an ATG communication system, the network device is a base station (5G base station), and the terminal device is an airplane. In this example, the 5G_ATG is required to complete an initial access. After GPS information of the airplane is received, DOA angle information is calculated in combination with GPS information of the base station, to obtain an antenna single polarization weight. Upon receiving the PMI information report from the terminal device, the base station performs antenna dual-polarized beamforming in combination with the DOA angle. In an embodiment, the following steps are included.

At step S801, after a cell is established, the base station will update GPS information every 24 hours or after the GPS of the base station is changed.

At step S802, after the airplane accesses to the cell, an airborne CPE reports the GPS information (including longitude/latitude, a height above the ground, an altitude and time) of the airplane or other parameters every second.

At step S803, a pitch angle $\alpha$ and a horizontal angle $\beta$ in the DOA of the airplane are calculated according to the GPS information of both the base station and the airplane. The specific calculation method may refer to the above steps S301 and S302.

At step S804, a forming weight $W_{DOA}$=conj(a($\alpha$,$\beta$)) in a DOA single polarization direction (first polarization direction) is calculated according to the DOA angle information. The specific value of the forming weight needs to be determined according to antenna hardware. The specific calculation method may refer to the above steps S401 and S402.

At step S805, the airplane reports the measured PMI information.

At S806, a phase difference $\phi$(ilayer)=angle($W_{pmi}(i_2$, ilayer)) between polarized antennas is calculated according to the report PMI, where ilayer is the number of layers of the transmitted data, $W_p$mi is a precoding vector generated according to the PMI information, and $i_2$ is a precoding index value. The specific calculation method may refer to the above steps S501 and S502.

At step S807, a forming weight $\tilde{W}_{DOA}=W_{DOA}\times e^{j\phi(ilayer)}$ in another polarization direction is calculated according to the phase difference and the calculated forming weight in the DOA polarization direction.

At step S808, according to an antenna index combined weight, power normalization is performed based on the number of scheduling layers to complete antenna dual-polarization beamforming. The specific processing process may refer to the above steps S701 and S702.

In accordance with an aspect of the present disclosure, a beamforming method is provided, which is applied to a terminal device communicatively connected to a network device. The terminal device may be a mobile terminal device or an immobile terminal device. The mobile terminal device may be a mobile phone, a tablet computer, a notebook computer, a palmtop computer, an on-board terminal device, a wearable device, a super mobile personal computer, a netbook, a personal digital assistant, a Customer Premises Equipment (CPE), a wireless hotspot device (UFI), etc. The immobile terminal device may be a personal computer, a TV set, a teller machine, a self-service machine, etc. This will not be specifically limited in the implementations of the present disclosure. For example, in the ATG communication system, the terminal device may include an Airborne Controller Processor Unit (ACPU), a WIFI hotpot device, an airborne CPE, etc. In some embodiments, the WIFI hotpot device is connected with the airborne CPE by means of the ACPU to provide Internet services to users of the terminal devices such as notebooks and mobile phones on the airplane, and the airborne CPE is communicatively connected to the gNB base station.

Figure 9:
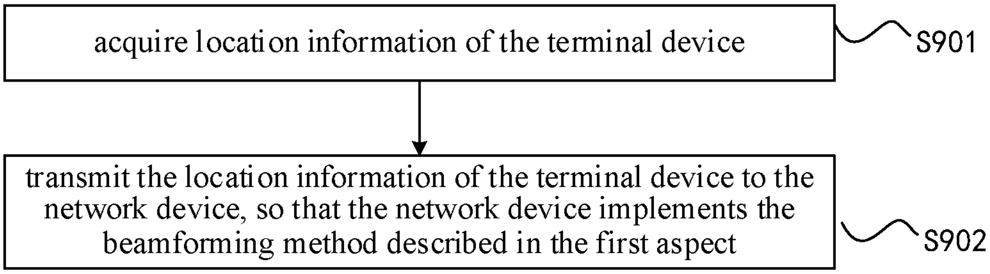
FIG. 9 is a flowchart of a beamforming method according to another embodiment of the present disclosure.

With reference to FIG. 9, the beamforming method provided in this embodiment of the present disclosure includes the following steps.

At step S901, location information of the terminal device is acquired.

At step S902, the location information of the terminal device is transmitted to the network device, so that the network device implements the beamforming method described in the above aspect.

In some embodiments, the location information of the terminal device may be GPS information, BEIDOU satellite positioning information, etc. After the terminal device enters the cell covered by the signal of the network device, the terminal device regularly implements step S801 to acquire the location information of the terminal device, and transmits the location information of the terminal device to the network device. For example, in the ATG communication system, after the airplane (the terminal device) accesses to the cell, the airplane reports the GPS information (including the longitude/latitude, the height above the ground, the altitude and the time) of the terminal device or other parameters every fixed period (e.g., 1 second), to ensure the timeliness and accuracy of the location information of the terminal device. For example, in the ATG communication system, after the airplane (the terminal device) accesses to the cell, the airborne CPE in the airplane transmits the GPS information of the airplane to the base station every 1 second.

In some embodiments, upon receiving the location information of the terminal device from the terminal device, the network device implements the beamforming method described in the above aspect to complete beamforming. For example, the network device may implement the beamforming method steps S101 to S106 described in the above aspect.

In the embodiment of the present disclosure, by acquiring the location information of the terminal device and transmitting the location information of the terminal device to the network device, the beams formed by the network device are narrower and higher in energy concentration, so that the signal-to-noise ratio is effectively improved.

In some embodiments, the location information of the terminal device includes a longitude $J_B$ of the terminal device, a latitude $W_B$ of the terminal device and a height $H_B$ of the terminal device. Then, the network device can obtain DOA information by a geometric operation according to the location information of the network device and the location information of the terminal device.

Figure 10:
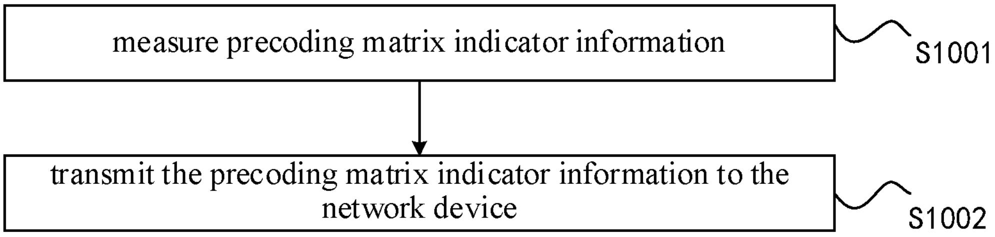
FIG. 10 is a flowchart of a beamforming method according to another embodiment of the present disclosure.

With reference to FIG. 10, in some embodiments, the beamforming method in the aspect further includes the following steps.

At step S1001, precoding matrix indicator information is measured.

At step S1002, the precoding matrix indicator information is transmitted to the network device.

In some embodiments, the terminal device transmits the precoding matrix indicator information to the network device by implementing steps S1001 and S1002. The network device receives the PMI information from the terminal device, and constructs an orthogonal codebook by utilizing the PMI information, so that one polarized antenna transmits two layers of data, the antenna again of each layer of data is increased and the anti-interference capability is improved. The specific implementation steps may refer to the description of the steps S101 to S106 in the above aspect and will not be repeated here.

In some embodiments, the terminal device measures Rank Indicator (RI) information and transmits the RI information to the network device, so that the network device performs normalization. The specific steps are as recorded in the steps S701 and S702 in the above aspect and will not be repeated here.

Figure 11:
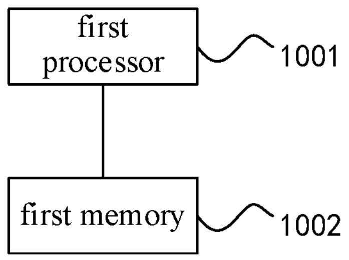
FIG. 11 is a module diagram of a network device according to an embodiment of the present disclosure.

In accordance with an aspect of the present disclosure, with reference to FIG. 11, an embodiment provides a network device. The network device includes a first memory 1002, a first processor 1001 and a program stored on the first memory 1002 and executable by the first processor 1001 which, when executed by the first processor 1001, causes the first processor 1001 to implement the beamforming method described in the above aspect.

In some embodiments, the network device may be a base station (e.g., a NodeB base station, an eNB base station, a gNB base station, etc.), or may be other network devices with base station functions. For example, in the ATG communication system, the network device includes a gNB base station, a core network and a related server. The core network provides communication services to a terminal device through the gNB base station. The network device has a dual-polarized antenna which is composed of two sets of antennas. Compared with ordinary vertically-polarized antenna elements, all antenna array elements in one set of antennas are rotated by +45 degrees, while the antenna elements in the other set of antennas are rotated by −45 degrees, so that the two sets of antennas are orthogonally polarized. By utilizing the dual-polarized array antennas, the size of antennas is observably decreased, the reliability of antennas is improved, and the interference is effectively reduced.

The first processor 1001 may include one or more processing units. For example, the first processor 1001 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), etc. Different processing units may be separate devices or may be integrated in one or more processors.

In some embodiments, the network device includes a first memory 1002, a first processor 1001 and a program stored on the memory 1002 and executable by the first processor 1001 which, when executed by the first processor 1001, causes the first processor 1001 to implement the beamforming method steps S101 to S105 in the above aspect or the beamforming method steps S101 to S106 in the above aspect.

Figure 12:
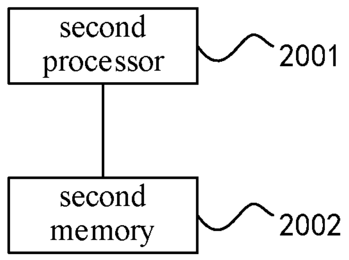
FIG. 12 is a module diagram of a terminal device according to an embodiment of the present disclosure.

In accordance with an aspect of the present disclosure, with reference to FIG. 12, an embodiment provides a terminal device. The terminal device includes a second memory 2002, a second processor 2001 and a program stored on the second memory 2002 and executable by the second processor 2001 which, when executed by the second processor 2001, causes the second processor 2001 to implement the beamforming method described in the above aspect.

In some embodiments, the terminal device may be a mobile terminal device or a non-mobile terminal device. The mobile terminal device may be a mobile phone, a tablet computer, a notebook computer, a palmtop computer, an on-board terminal device, a wearable device, a super mobile personal computer, a netbook, a personal digital assistant, a Customer Premises Equipment (CPE), a wireless hotspot device (UFI), etc. The immobile terminal device may be a personal computer, a TV set, a teller machine, a self-service machine, etc. This will not be specifically limited in the implementations of the present disclosure. For example, in the ATG communication system, the terminal device may include an Airborne Controller Processor Unit (ACPU), a WIFI hotpot device, an airborne CPE, etc. In some embodiments, the WIFI hotpot device is connected with the airborne CPE by means of the ACPU to provide Internet services to users of the terminal devices such as notebooks and mobile phones on the airplane, and the airborne CPE is communicatively connected to the gNB base station.

The second processor 2001 may include one or more processing units. For example, the first processor 2001 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), etc. Different processing units may be separate devices or may be integrated in one or more processors.

In some embodiments, the terminal device includes a second memory 2002, a second processor 2001 and a program stored on the second memory 2002 and executable by the second processor 2001 which, when executed by the second processor 2001, causes the second processor 2001 to implement the beamforming method steps S901 to S902 in the above aspect or the beamforming method steps S901, S902, S1001 and S1002 in the above aspect.

In accordance with an aspect of the present disclosure, an embodiment further provides a storage medium for computer-readable storage, where the storage medium stores at least one program which, when executed by at least one processer, causes the least one processer to implement: the beamforming method applied to the network device described in the above aspect; or, the beamforming method applied to the terminal device communicatively connected to a network device described in the above aspect.

In accordance with the embodiments of the present disclosure, DOA information is acquired; a first beamforming weight in a first polarized direction is obtained according to the DOA information; precoding matrix indicator information is acquired; a phase difference between the first polarized antenna direction and a second polarized antenna direction is acquired according to the precoding matrix indicator information; a second beamforming weight in the second polarized antenna direction is obtained according to the first beamforming weight and the phase difference; and, a formed beam is produced according to the first beamforming weight and the second beamforming weight. In the embodiments of the present disclosure, by performing beamforming in the first polarization direction using the DOA algorithm, the beams formed by the network device are narrower and higher in energy concentration, which effectively improves the signal-to-noise ratio. By constructing beamforming in the second polarization direction using the precoding matrix indicator information, one polarized antenna transmits two layers of data, and the antenna gain of each layer of data is increased, so that the inter-interference capability and transmission traffic of transmission channels are effectively improved.

It should be understood by those having ordinary skills in the art that, all or some of the steps in the methods disclosed above and functional modules/units in the systems and devices disclosed above may be implemented as software, firmware, hardware and suitable combinations thereof.

In the hardware implementation, the division of the functional modules/units mentioned above does not necessarily correspond to the division of physical components. For example, one physical component may have a plurality of functions, or one function or step may be cooperatively executed by a number of physical components. Some or all of the physical components may be implemented as software executed by processors such as central processors, digital signal processors or microprocessors, or implemented as hardware, or implemented as integrated circuits such as application-specific integrated circuits. Such software may be distributed on computer-readable mediums that may include computer storage mediums (or non-temporary mediums) and communication mediums (or temporary mediums). As well-known to those having ordinary skills in the art, the term computer storage medium includes volatile or non-volatile and removable or non-removable mediums implemented in any method or technology used to store information (such as computer-readable instructions, data structures, program modules or other data). The computer storage medium may include, but not limited to, RAMs, ROMs, EEPROMs, flash memories and other memory technologies, CD-ROMs, digital versatile disks (DVDs) or other optical disk storages, magnetic cassettes, magnetic tapes, magnetic disk storages or other magnetic storage devices, or any other mediums that can be used to store desired information and can be accessed by computers. In addition, as well-known to those having ordinary skills in the art, the communication mediums generally contain computer-readable instructions, data structures, program modules or other data in modulated data signals such as carriers or other transmission mechanisms, and may include any information transfer medium.

Although some embodiments of the present disclosure have been described above, the present disclosure is not limited to the above implementations. Those having ordinary skills in the art can make various equivalent variations or replacements without departing from the scope of the present disclosure, and these equivalent variations or replacements shall fall into the scope defined by the appended claims of the present disclosure.

What is claimed is:

1. A beamforming method applied to a network device, comprising:

acquiring Direction of Arrival (DOA) information;

obtaining a first beamforming weight $W_{DOA}$ in a first polarized antenna direction according to the DOA information;

acquiring precoding matrix indicator information;

obtaining a precoding index value according to the precoding matrix indicator information;

generating a precoding vector according to the precoding index value and the number of layers of transmitted data, and calculating a complex phase angle of the precoding vector to obtain a phase difference $\phi$ (ilayer) between the first polarized antenna direction and a second polarized antenna direction according to the precoding index value, wherein ilayer is the number of layers of the transmitted data;

obtaining a second beamforming weight $\tilde{W}_{DOA}$ in the second polarized antenna direction according to the first beamforming weight $W_{DOA}$ and the phase difference $\phi$ (ilayer); and producing a formed beam according to the first beamforming weight and the second beamforming weight.

2. The method of claim 1, wherein acquiring DOA information comprises:

acquiring location information of the network device and location information of a terminal device, respectively; and calculating the DOA information according to the location information of the network device and the location information of the terminal device.

3. The method of claim 2, wherein:

the location information of the network device comprises a longitude $J_A$ of the network device and a height $H_A$ of the network device;

the location information of the terminal device comprises a longitude $J_B$ of a terminal device, a latitude $W_B$ of the terminal device and a height $H_B$ of the terminal device; and, the DOA information comprises a pitch angle $\alpha$ and a horizontal angle $\beta$; and calculating the DOA information according to the location information of the network device and the location information of the terminal device comprises:

calculating the pitch angle $\alpha$ according to the location information of the network device, the location information of the terminal device and a first calculation formula; and calculating the horizontal angle $\beta$ according to the location information of the network device, the location information of the terminal device and a second calculation formula;

wherein the first calculation formula is:

$$\alpha = \arccos\left[\frac{(R+H_A)^2 + |AB|^2 - (R+H_B)^2}{2(R+H_A)\cdot|AB|}\right];$$

the second calculation formula is:

$$\beta = \arcsin\left[\left|\frac{\cos(W_B)\cdot\sin(J_B - J_A)}{\sqrt{1-\cos^2(\angle AOB)}}\right|\right],$$

where R is a radius of the earth, and $\angle$AOB is an included angle formed by the network device A and the terminal device B by taking a center O of the earth as a vertex.

4. The method of claim 1, wherein obtaining a first beamforming weight in a first polarized antenna direction according to the DOA information comprises:

looking up a steering vector conjugate table according to the DOA information to obtain a steering vector; and performing an operation on the steering vector to obtain the first beamforming weight.

5. The method of claim 1, wherein the second beamforming weight $\tilde{W}_{DOA}$ in the second polarized antenna direction is calculated according to a second calculation formula $\tilde{W}_{DOA} = W_{DOA} \times e^{j\varphi(ilayer)}$.

6. The method of claim 1, wherein producing a formed beam according to the first beamforming weight and the second beamforming weight comprises:

normalizing the first beamforming weight and the second beamforming weight to obtain a normalized combined weight; and producing the formed beam according to the normalized combined weight.

7. The method of claim 6, wherein normalizing the first beamforming weight and the second beamforming weight to obtain a normalized combined weight comprises:

normalizing the first beamforming weight and the second beamforming weight by a third calculation formula to obtain the normalized combined weight;

wherein the third calculation formula is:

$$W_{bf} = \begin{bmatrix} W_{DOA} \\ \tilde{W}_{DOA} \end{bmatrix} / \sqrt{RI};$$

where $W_{bf}$ is the normalized combined weight, and RI is layer indicator information.

8. A network device, comprising a first memory, a first processor, and a program stored in the first memory and executable by the first processor which, when executed by the first processor, causes the first processor to perform a beamforming method comprising:

acquiring Direction of Arrival (DOA) information;

obtaining a first beamforming weight $W_{DOA}$ in a first polarized antenna direction according to the DOA information;

acquiring precoding matrix indicator information;

obtaining a precoding index value according to the precoding matrix indicator information;

generating a precoding vector according to the precoding index value and the number of layers of transmitted data, and calculating a complex phase angle of the precoding vector to obtain a phase difference $\phi$ (ilayer) between the first polarized antenna direction and a second polarized antenna direction according to the precoding index value, wherein ilayer is the number of layers of the transmitted data;

obtaining a second beamforming weight $\tilde{W}_{DOA}$ in the second polarized antenna direction according to the first beamforming weight $W_{DOA}$ and the phase difference $\phi$ (ilayer); and producing a formed beam according to the first beamforming weight and the second beamforming weight.

9. The network device of claim 8, wherein acquiring DOA information comprises:

acquiring location information of the network device and location information of a terminal device, respectively; and calculating the DOA information according to the location information of the network device and the location information of the terminal device.

10. The network device of claim 8, wherein the location information of the network device comprises a longitude $J_A$ of the network device and a height $H_A$ of the network device; the location information of the terminal device comprises a longitude $J_B$ of the terminal device, a latitude $W_B$ of the terminal device and a height $H_B$ of the terminal device; and the DOA information comprises a pitch angle α and a horizontal angle β; and calculating the DOA information according to the location information of the network device and the location information of the terminal device comprises:

calculating the pitch angle α according to the location information of the network device, the location information of the terminal device and a first calculation formula; and calculating the horizontal angle β according to the location information of the network device, the location information of the terminal device and a second calculation formula;

wherein the first calculation formula is:

$$\alpha = \arccos\left[\frac{(R+H_A)^2 + |AB|^2 - (R+H_B)^2}{2(R+H_A)\cdot|AB|}\right];$$

the second calculation formula is:

$$\beta = \arcsin\left[\left|\frac{\cos(W_B)\cdot\sin(J_B - J_A)}{\sqrt{1-\cos^2(\angle AOB)}}\right|\right];$$

where R is a radius of the earth, and ∠AOB is an included angle formed by the network device A and the terminal device B by taking a center O of the earth as a vertex.

11. The network device of claim 8, wherein obtaining a first beamforming weight in a first polarized antenna direction according to the DOA information comprises:

looking up a steering vector conjugate table according to the DOA information to obtain a steering vector; and performing an operation on the steering vector to obtain the first beamforming weight.

12. The network device of claim 8, wherein the second beamforming weight $\tilde{W}_{DOA}$ in the second polarized antenna direction is calculated according to a second calculation formula $\tilde{W}_{DOA}=W_{DOA}\times e^{j\varphi(ilayer)}$.

13. The network device of claim 8, wherein producing a formed beam according to the first beamforming weight and the second beamforming weight comprises:

normalizing the first beamforming weight and the second beamforming weight to obtain a normalized combined weight; and producing the formed beam according to the normalized combined weight.

14. The network device of claim 13, wherein normalizing the first beamforming weight and the second beamforming weight to obtain a normalized combined weight comprises:

normalizing the first beamforming weight and the second beamforming weight by a third calculation formula to obtain the normalized combined weight;

wherein the third calculation formula is:

$$W_{bf} = \begin{bmatrix} W_{DOA} \\ \tilde{W}_{DOA} \end{bmatrix} / \sqrt{RI};$$

where $W_{bf}$ is the normalized combined weight, and RI is layer indicator information.

15. A non-transitory computer-readable storage medium storing at least one program which, when executed by at least one processor, causes the at least one processor to perform a beamforming method comprising:

acquiring Direction of Arrival (DOA) information;

obtaining a first beamforming weight $W_{DOA}$ in a first polarized antenna direction according to the DOA information;

acquiring precoding matrix indicator information;

obtaining a precoding index value according to the precoding matrix indicator information;

calculating a phase difference ϕ (ilayer) between the first polarized antenna direction and a second polarized antenna direction according to the precoding index value, wherein ilayer is the number of layers;

generating a precoding vector according to the precoding index value and the number of layers of transmitted data, and calculating a complex phase angle of the precoding vector to obtain a phase difference ϕ (ilayer) between the first polarized antenna direction and a second polarized antenna direction according to the precoding index value, wherein ilayer is the number of layers of the transmitted data; and producing a formed beam according to the first beamforming weight and the second beamforming weight.

16. The non-transitory computer-readable storage medium of claim 15, wherein acquiring DOA information comprises:

acquiring location information of the network device and location information of a terminal device, respectively; and calculating the DOA information according to the location information of the network device and the location information of the terminal device.

17. The non-transitory computer-readable storage medium of claim 16, the location information of the network device comprises a longitude $J_A$ of the network device and a height $H_A$ of the network device; wherein the location information of the terminal device comprises a longitude $J_B$ of the terminal device, a latitude $W_B$ of the terminal device and a height $H_B$ of the terminal device; and the DOA information comprises a pitch angle α and a horizontal angle β; and calculating the DOA information according to the location information of the network device and the location information of the terminal device comprises:

calculating the pitch angle α according to the location information of the network device, the location information of the terminal device and a first calculation formula; and calculating the horizontal angle β according to the location information of the network device, the location information of the terminal device and a second calculation formula;

wherein the first calculation formula is:

$$\alpha = \arccos\left[\frac{(R+H_A)^2 + |AB|^2 - (R+H_B)^2}{2(R+H_A)\cdot|AB|}\right];$$

the second calculation formula is:

$$\beta = \arcsin\left[\left|\frac{\cos(W_B)\cdot\sin(J_B - J_A)}{\sqrt{1-\cos^2(\angle AOB)}}\right|\right];$$

where R is a radius of the earth, and ∠AOB is an included angle formed by the network device A and the terminal device B by taking a center O of the earth as a vertex.

18. The non-transitory computer-readable storage medium of claim 15, wherein obtaining a first beamforming weight in a first polarized antenna direction according to the DOA information comprises:

looking up a steering vector conjugate table according to the DOA information to obtain a steering vector; and performing an operation on the steering vector to obtain the first beamforming weight.

19. The non-transitory computer-readable storage medium of claim 15, wherein the second beamforming weight $\tilde{W}_{DOA}$ in the second polarized antenna direction is calculated according to a second calculation formula $\tilde{W}_{DOA}=W_{DOA}\times e^{j\varphi(ilayer)}$.

20. The non-transitory computer-readable storage medium of claim 15, wherein producing a formed beam according to the first beamforming weight and the second beamforming weight comprises:

normalizing the first beamforming weight and the second beamforming weight to obtain a normalized combined weight; and producing the formed beam according to the normalized combined weight.

* * * * *